(12) United States Patent  (10) Patent No.: US 7,664,377 B2
Liao  (45) Date of Patent: Feb. 16, 2010

(54) DRIVING APPARATUS FOR A CEILING FAN

(75) Inventor: Yin Sheng Liao, Taichung (TW)

(73) Assignee: Rhine Electronic Co., Ltd., Taichung County (TW)

( * ) Notice: Subject to any disclaimer, the term of this patent is extended or adjusted under 35 U.S.C. 154(b) by 348 days.

(21) Appl. No.: 11/840,586

(22) Filed: Aug. 17, 2007

(65) Prior Publication Data

US 2009/0047005 A1    Feb. 19, 2009

(30) Foreign Application Priority Data

Jul. 19, 2007    (CN) .................... 2007 1 0138661

(51) Int. Cl.
*H02P 1/18*    (2006.01)

(52) U.S. Cl. .................. 388/851; 388/859; 318/560; 318/565; 310/26; 310/68 B; 310/68 R; 310/68 C; 310/75 R; 310/154.37

(58) Field of Classification Search ............... 388/851, 388/859; 310/26, 68 B, 68 R, 68 C, 75 R, 310/154.37; 318/560, 565
See application file for complete search history.

(56) References Cited

U.S. PATENT DOCUMENTS

| 4,357,563 | A | * | 11/1982 | Ohno | .................... | 318/400.41 |
|---|---|---|---|---|---|---|
| 4,438,359 | A | * | 3/1984 | Royer | .................... | 310/68 R |
| 4,891,567 | A | * | 1/1990 | Fujitani et al. | .................... | 318/400.41 |
| 4,935,653 | A | * | 6/1990 | Cheng | .................... | 310/72 |
| 5,045,740 | A | * | 9/1991 | Hishinuma | .................... | 310/156.45 |
| 5,095,238 | A | * | 3/1992 | Suzuki et al. | .................... | 310/156.46 |
| 5,850,130 | A | * | 12/1998 | Fujisaki et al. | .................... | 318/400.2 |
| 5,864,192 | A | * | 1/1999 | Nagate et al. | .................... | 310/156.05 |
| 6,392,372 | B1 | * | 5/2002 | Mays, II | .................... | 318/400.01 |
| 6,487,977 | B1 | * | 12/2002 | Williams et al. | .................... | 108/50.12 |
| 6,490,752 | B2 | * | 12/2002 | Kushida et al. | .................... | 15/319 |
| 6,545,438 | B1 | * | 4/2003 | Mays, II | .................... | 318/400.01 |
| 6,630,659 | B1 | * | 10/2003 | Stridsberg | .................... | 250/231.13 |

\* cited by examiner

*Primary Examiner*—Rita Leykin
(74) *Attorney, Agent, or Firm*—Holland & Knight LLP; Brian J. Colandreo, Esq.

(57) ABSTRACT

A driving apparatus for a DC brushless motor of a ceiling fan is provided. By setting at least one coder and one sensor outside the DC brushless motor, the driving apparatus can sense the position of magnetic poles of the motor for driving the motor. Meanwhile, a controller set with the motor stores the rotation speed of the motor before being turned off by detecting the turn-off time of a turn-on/off signal.

16 Claims, 6 Drawing Sheets

DRIVING APPARATUS FOR A CEILING FAN

RELATED APPLICATION

This application claims the benefit of priority based on Chinese Patent Application No. 200710138661.0 filed on Jul. 19, 2007.

BACKGROUND

1. Field of the Invention

The present invention relates to a driving apparatus for a ceiling fan; more particularly, the present invention relates to a driving apparatus for the DC brushless motor of a ceiling fan, the driving apparatus of which comprises a coder and a sensor disposed outside the DC brushless motor.

2. Descriptions of the Related Art

DC brushless motors have several advantages, such as high torque at low speed, low electromagnetic interference, no noise, and maintenance free of carbon brushes. However, to maintain smooth operation of a DC brushless motor, and to have it start successfully from a stationary state, electromagnetic sensors (e.g., hall sensors) have to be placed in these motors to sense the variation of the magnetic field due to positional variation of the magnetic poles relative to the stator. The controller of the DC brushless motor can then supply power to stator coils in response to output of the sensors to ensure continuous and steady operation of the motor.

Inside the DC brushless motor is a rotor made of a permanent magnetic material. In order to determine the rotational position of the motor, hall sensors are arranged inside the motor corresponding to position of the stator, so that the positional variation of the magnetic poles resulting from rotation of the rotor can be sensed for the purpose of motor driving. Upon startup of the motor, the hall sensors consciously sense each rotation of the motor, so that the control circuit can drive the motor in a steady manner.

Taking a three-phase DC brushless motor for a ceiling fan as an example, the motor comprises three electromagnetic sensors. Since the electromagnetic sensors are located inside the motor, some destructive processes such as drilling are preformed on the hardware in order to route the transmission lines between the motor and the controlling circuit for transmitting output signals from the electromagnetic sensors. For example, the number of connection holes need to be opened on the motor axle, so that the transmission lines can pass through to connect with the controller. Obviously, such large connection holes may compromise the integrity of the motor axle, and put the user in danger after long periods of service.

Furthermore, conventional motors used in ceiling fans are manually controlled, which means that control operations such as rotation speed adjustment and turning-on/-off of the motors are performed in a contact mode. In the conventional operation mode, rotation speed of the motors can only be controlled in a round-robin switching manner, in which case, once the motors are turned off, they can only be restarted at the next speed but not at the previous speed. To obtain the same speed as that before it is turned off, the user has to turn on and off the motor in succession through the entire operation cycle, which is particularly inconvenient.

Further, when the fan operates under an increased load, if the controller is not provided with a protection function, the motor overheat or even fail under an unendurable load.

In view of this, it is highly desirable in the art to provide a driving apparatus that can start up and drive a DC brushless motor for a ceiling fan without the need of electromagnetic sensors, and a controller that can store a previous rotation speed of a DC brushless motor while being provided with a protection function.

SUMMARY OF THE INVENTION

An objective of this invention is to provide a driving apparatus for a DC brushless motor of a ceiling fan. By setting sensors and coders outside the DC brushless motor, the DC brushless motor can be driven without the need of electromagnetic sensors. In this way, the number of transmission lines that are used is reduced, thereby reducing the amount of excessively large holes opened in hardware of the motor, thus reducing the loss of structural integrity in the motor 1.

By setting the coders to correspond to the position of magnetic poles included in the DC brushless motor, and having the coders rotate in sync with the motor, the position of the magnetic poles can be determined in order to drive the motor.

Another objective of this invention is to provide a controller that can store the rotation speed of a DC brushless motor, so that when turned off and then restarted again, the motor can resume operation at the rotation speed it possessed when it was turned off.

This invention stores the rotation speed of the motor before it was turned off by detecting a turn-off time, and has the motor reacquire this previous rotation speed when restarted, thereby eliminating the need of the round-robin switching mode.

Yet a further objective of this invention is to provide a protection circuit, which, by comparing a signal related to the rotating load of the DC brushless motor against a reference, can reduce the rotation speed of, or turn off completely, the motor in order to protect it from any damage.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

This invention relates primarily to the application of the sensing technology in the driving control of a DC brushless motor of a ceiling fan, and will be described in detail hereinafter with reference to the preferred embodiment.

Figure 1:
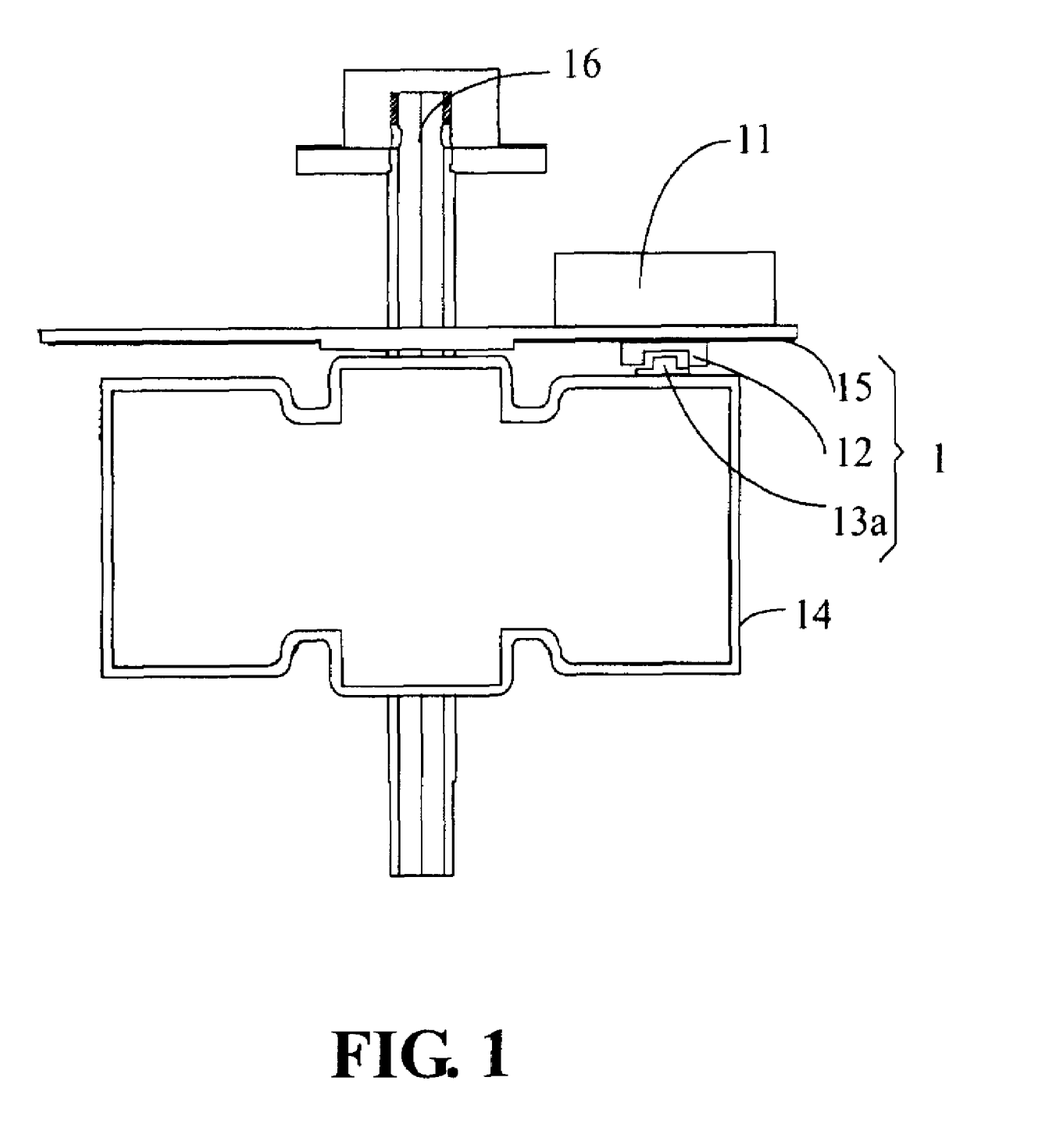
FIG. 1 is a schematic view of the driving apparatus of this invention, the DC brushless motor for a ceiling fan, and a controller.
Figure 3:
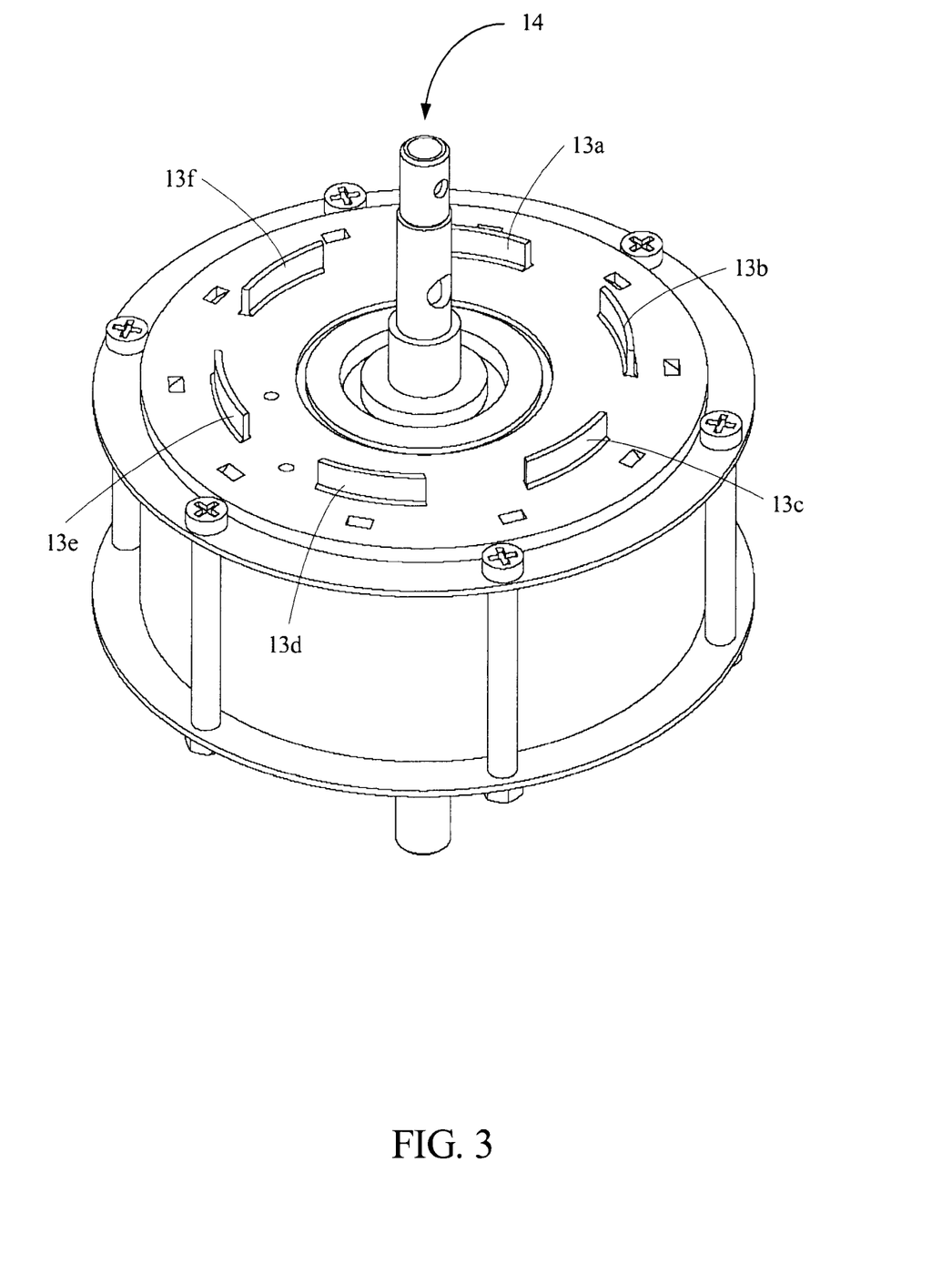
FIG. 3 is a schematic view of the position of a plurality of coders relative to the DC brushless motor.

FIG. 1 depicts a schematic view of the driving apparatus 1 for the ceiling fan (not shown), the DC brushless motor 14 included in the ceiling fan, and the controller 11. The driving apparatus 1 comprises a supporting element 15, a sensor 12, and a plurality of coders 13*a*~13*h*. For clarity, only one coder 13*a* is illustrated in FIG. 1. In this embodiment, the sensor 12 is an infrared ray interceptor, that is, an invisible spectrum interceptor, and the plurality of coders 13a~13h are intercepting coders with a specific lateral dimension as shown in FIG. 3. In other embodiments, the driving apparatus may also comprise a plurality of sensors arranged corresponding to the position of the stator in order to sense the motion of the plurality of coders respectively. Further, there may also be only a single coder, which is arranged on a shell of the DC brushless motor corresponding to the position of a pair of magnetic poles. The number and position of the coders is related to the number and positions of the magnetic poles, while the position of the sensor is related to the position of the stator.

The driving apparatus 1 is arranged between the DC brushless motor 14 and the controller 11, and is electrically connected to the controller 11. The DC brushless motor 14 and the supporting element 15 of the driving apparatus 1 are connected to each other via the axle 16. The DC brushless motor 14 comprises a stator (not shown) and a plurality of pairs of magnetic poles (also not shown). The sensor 12 is arranged on the supporting element 15 corresponding to the position of the stator. In this embodiment, the sensor 12 and the controller 11 are arranged respectively on either side of the supporting element 15, which in turn is fixed on the axle 16. During operation, the DC brushless motor 14 rotates about the axle 16. The sensor 12 is electrically connected to the controller 11 and is interposed between the supporting element 15 and the shell of the DC brushless motor 14 to sense the motion of the plurality of coders 13a~13h. Taking the coder 13a as an example, it has a specific lateral dimension and is arranged on the motor shell corresponding to the position of the pair of magnetic poles, in order to rotate in sync with the DC brushless motor 14. The sensor 12, which is arranged corresponding to the position of the stator, is stationary; and when the coder 13a passes by the sensor 12, the sensor 12 operates to sense the lateral dimension thereof to generate an output signal for use by the controller to control the operation of the DC brushless motor 14. Similarly, when other coders 13b~13h pass by the sensor in sequence, the sensor 12 operates to sense their respective lateral dimensions to generate a plurality of output signals for use by the controller 11 to control the operation of the DC brushless motor 14. In other embodiments, the DC brushless motor may also comprise only one pair of magnetic poles.

Figure 2:
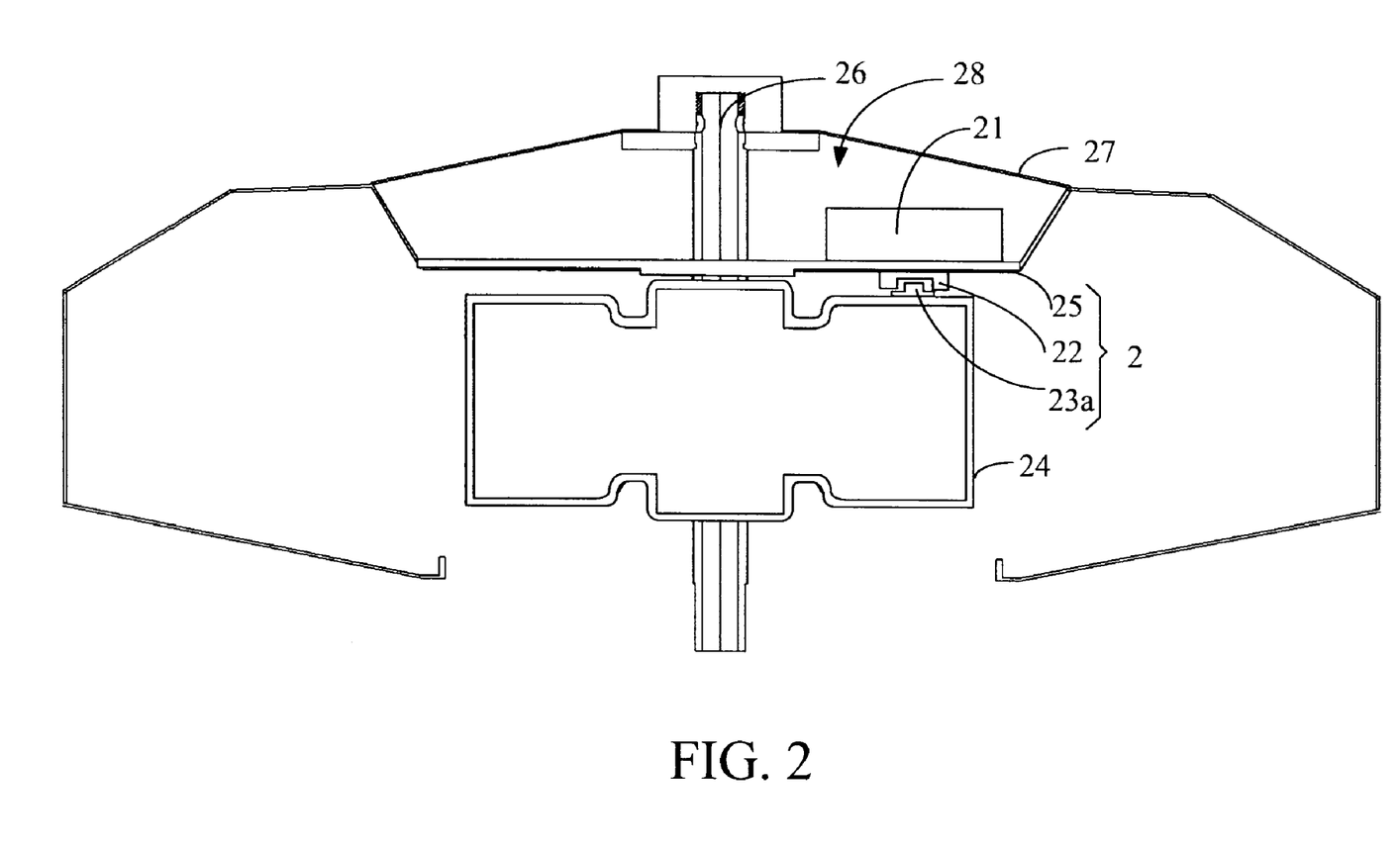
FIG. 2 is another schematic view of the driving apparatus of this invention, the DC brushless motor for a ceiling fan, and the controller.

In another preferred embodiment, a supporting element with a receiving space can be utilized to receive the controller therein, as shown in FIG. 2. The driving apparatus 2 comprises a supporting element 25, a sensor 22, and a plurality of coders. For clarity, only one coder 23a is illustrated here. The supporting element 25 functions with a top cover 27 to define a receiving space 28 into which a controller 21 can be disposed. The top cover 27 is detachable from the supporting element 25 to facilitate the installation of the controller 21. The sensor 22 and the controller 21 are arranged respectively on either side of the supporting element 25, which in turn is fixed on an axle 26. During operation, the DC brushless motor 24 rotates about the axle 26. The coder 23a also has a lateral dimension and rotates in sync with the DC brushless motor 24. When the coder 23a passes by the sensor 22, the sensor 22 operates to sense the lateral dimension thereof to generate an output signal for transmitting to the controller 21.

As shown in FIG. 3, the plurality of coders 13a~13h are arranged on the shell of the DC brushless motor 14 corresponding to a plurality of pairs of magnetic poles included in the motor 14, each coder having a different lateral dimension. In this embodiment, the number of coders is the same as the number of pairs of magnetic poles. When the coders 13a~13h pass by the sensor 12 in sequence during synchronous rotation with the DC brushless motor 14, the sensor 12 generates a plurality of output signals with different pulse widths for use by the controller to control the operation of the DC brushless motor 14.

Figure 4:
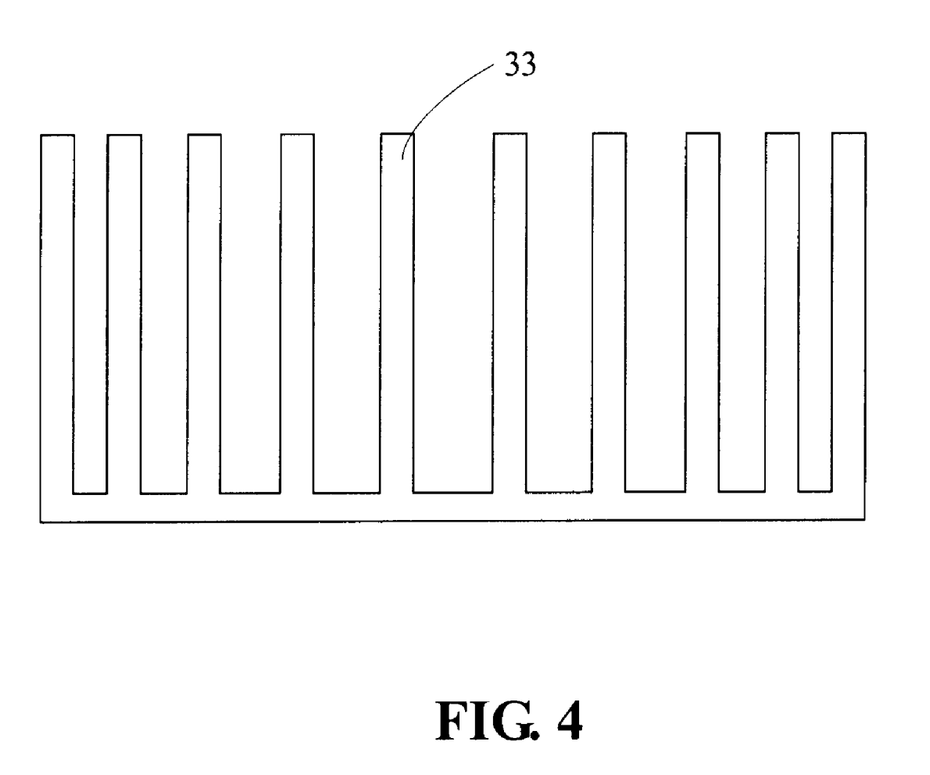
FIG. 4 is a schematic view of a single coder.

In another preferred embodiment as seen in FIG. 4, a coder 33 may comprise a plurality of sub-coders each having equal lateral dimensions but arranged in different intervals. In this way, by adjusting the intervals between the sub-coders, different output signals can be obtained when the coder 33 passes by the sensor.

Figure 5:
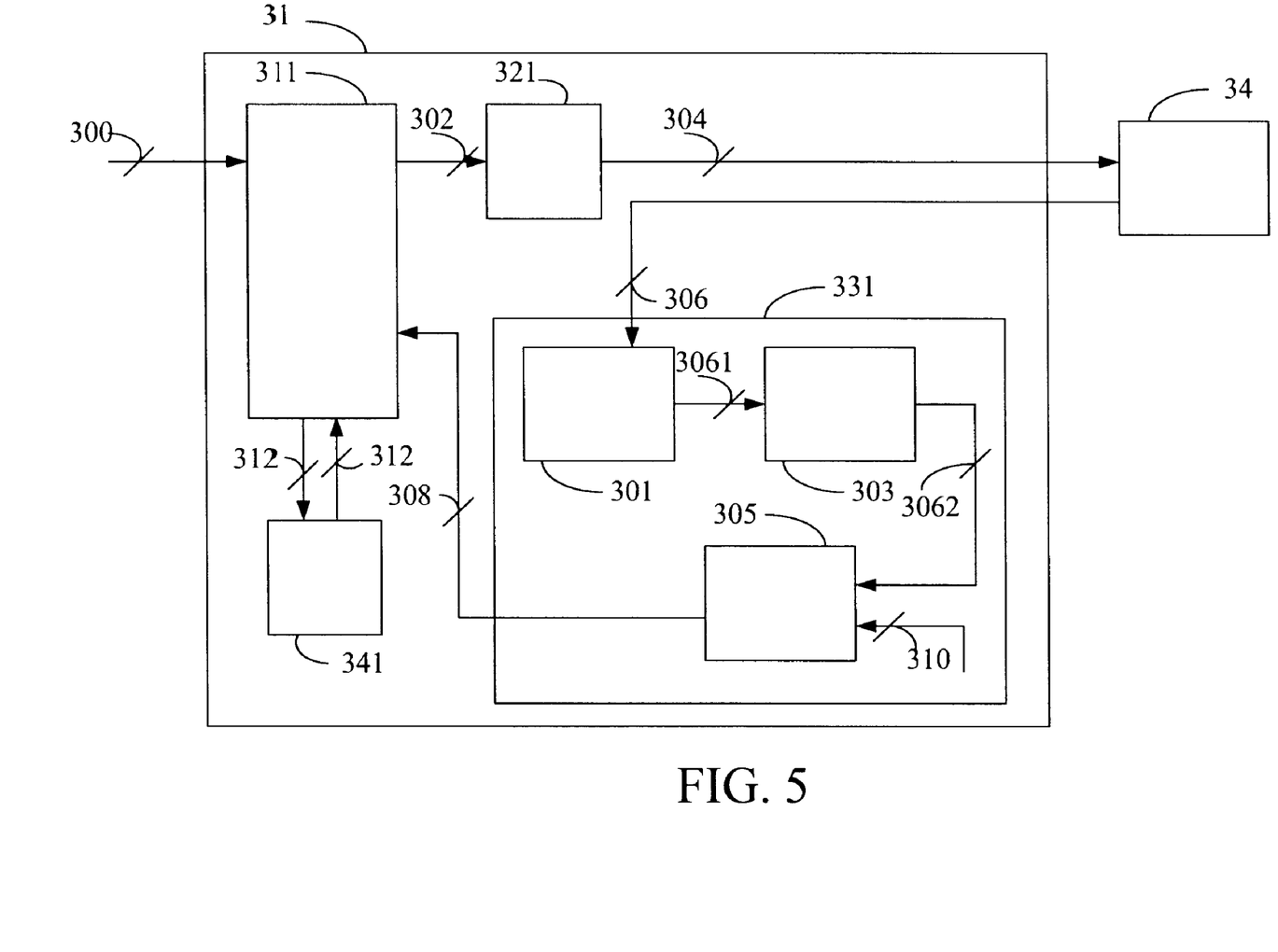
FIG. 5 is a circuit block diagram of the controller.

FIG. 5 depicts a circuit block diagram of a controller 31 in yet another preferred embodiment. The controller 31 comprises a control circuit 311, a drive circuit 321, a protection circuit 331, and a memory unit 341. In this embodiment, the DC brushless motor can operate at a plurality of rotation speeds under control of the controller 31.

Figure 6:
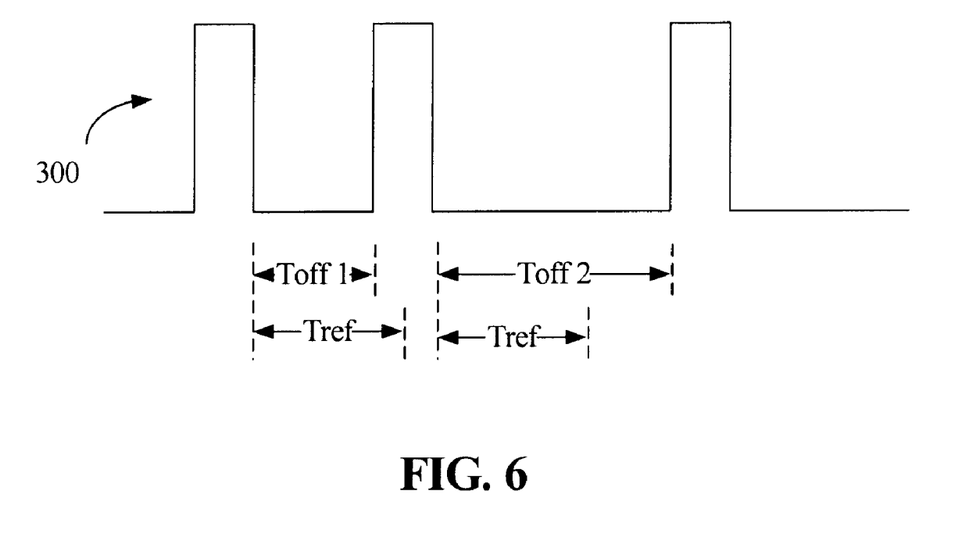
FIG. 6 is a schematic waveform diagram of a turn-on/-off signal.

The control circuit 311 is configured to generate a control signal 302 in response to a turn-on/-off signal 300 it receives. FIG. 6 depicts a schematic waveform diagram of the turn-on/-off signal 300, wherein the low level of the turn-on/-off signal 300 represents a turn-off status of the DC brushless motor 34, while the high level of the turn-on/-off signal 300 represents the turn-on status of the DC brushless motor 34. In response to the control signal 302 it receives, the drive circuit 321 generates a drive signal 304 for controlling the rotation speed of the DC brushless motor 34. Specifically, if the turn-on/-off signal 300 changes to a turn-on level again after a turn-off time Toff1, which is less than a reference time Tref, the rotation speed of the motor will be changed once. On the other hand, if the turn-off time Toff2 of the turn-on/-off signal 300 exceeds the reference time Tref, the control circuit 311 will generate a rotation speed signal representing the rotation speed when the DC brushless motor is turned-off, and stores that signal to the memory unit 341. Thus, when the turn-on/-off signal 300 changes again to a turn-on level, the control circuit 311 can read the rotation speed signal 312 back from the memory unit 341 to control the DC brushless motor 34.

The protection circuit 331 is configured to receive a load signal 306 related to the rotating load of the DC brushless motor 34 and generate a protection signal 308, according to which, the control circuit 311 will control the operation of the DC brushless motor 34. Specifically, the protection circuit 331 comprises a current sensor 301, a filter 303, and a comparator 305. The current sensor 301 is configured to receive the load signal 306 and convert it into a voltage signal 3061. The filter 303 is configured to receive a voltage signal 3061 and filter it to generate a filtered voltage signal 3062. The comparator 303 is configured to receive the filtered voltage signal 3062 and compare it against a reference 310 to generate a protection signal 308. If the filtered voltage signal 3062 exceeds the reference 310, then an increased load of the DC brushless motor 34 is indicated, in which case, the protection signal 308 functions to decrease the rotation speed of the DC brushless motor 34 to reduce the load thereof. For example, to avoid damage to the DC brushless motor 34 due to high temperature caused by an excessive load, the load signal 306 can be a signal related to the operating temperature of the DC brushless motor 34, so that when the operating temperature becomes too high, the protection circuit 331 can output the protection signal 308 to control the operation of the DC brushless motor 34. Upon reception of the protection signal 308, the control circuit 311 outputs the control signal 302 to decrease the rotation speed of the DC brushless motor 34.

When the rotation speed of the DC brushless motor 34 decreases in response to the protection signal 308, the filtered voltage signal 3062 related to the load signal 306 also decreases accordingly. When the filtered voltage signal 3062 decreases to below the reference 310 again, which means the load of the DC brushless motor 34 has been reduced, the protection signal 308 functions to increase the rotation speed of the motor 34.

In other embodiments, the protection signal 308 may also be configured to turn off the motor 34. If the filtered voltage signal 3062 exceeds the reference 310, then an excessive load of the motor 34 is indicated, in which case the protection signal 308 functions to turn off the motor 34 to avoid damage of the motor.

Additionally, as would occur readily to those skilled in the field of comparators, the comparator 305 can be modified somewhat to have two references, so that it can compare the filtered voltage signal 3062 against the two references to accomplish the function of decreasing the rotation speed of the DC brushless motor 34 or turning off the motor 34.

It follows from the above disclosure that, by use of coders and sensors arranged outside the shell of the DC brushless motor, the present driving apparatus for the ceiling fan can sense the rotation position of magnetic poles included in the DC brushless motor to control the rotation of the motor. This eliminates electromagnetic sensors and transmission lines that would otherwise be needed inside the DC brushless motor, thus replacing the need of connection holes opened on the hardware or axle of the motor for the use of transmission lines. In this way, the structural integrity of the motor is maintained and the service life of the motor is prolonged. Meanwhile, the convenience of use of the motor is improved, as the controller of the DC brushless motor can store the rotation speed of the motor when it is turned off. Furthermore, the controller is provided with a protection circuit, so that under a high load that is too high, the motor can operate with decreased rotation speed or be completely turned off to protect it from any damage.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An driving apparatus for being applied in a ceiling fan, the ceiling fan comprising a direct current (DC) brushless motor, an axle, and a controller, the driving apparatus being configured between the DC brushless motor and the controller and being electrically connected to the controller, the DC brushless motor comprising a stator and at least one pair of magnetic poles, the driving apparatus comprising:
   a supporting element, being connected to the DC brushless motor via the axle;
   at least one coder, each of the at least one coder being set on the shell of the DC brushless motor corresponding to the position of the at least one pair of magnetic poles, each of the at least one coder having a lateral dimension and synchronously rotating with the DC brushless motor;
   at least one sensor being electrically connected to the controller, the at least one sensor being set on the supporting element corresponding to the position of the stator and between the supporting element and the shell of the DC brushless motor, the at least one sensor being configured to sense the motion of the at least one coder;
   wherein each of the at least one sensor generates at least one output signal in response to the lateral dimension of the at least one coder, the controller controls operation of the DC brushless motor according to the at least one output signal.

2. The driving apparatus as claimed in claim 1, wherein the at least one sensor comprises an invisible spectrum interceptor, and the at least one coder comprises an intercepting coder.

3. The driving apparatus as claimed in claim 1, wherein the at least one sensor comprises an infrared rays interceptor.

4. The driving apparatus as claimed in claim 1, wherein:
   number of the at least one pair of the magnetic poles is plural;
   number of the at least one coder is plural, each of the coders comprises different lateral dimension from each other and is set in response to the positions of the plurality of pairs of the magnetic poles; and
   each of the at least one sensor senses the lateral dimensions of the coders to generate a plurality of output signals with different pulse widths, and the controller controls operation of the DC brushless motor according to the output signals.

5. The driving apparatus as claimed in claim 4, wherein the number of the coders is equal to the number of the pairs of the magnetic poles.

6. The driving apparatus as claimed in claim 1, wherein each one of the coders comprises a plurality of sub-coders, in which each of the sub-coders has equal lateral dimension.

7. The driving apparatus as claimed in claim 6, wherein the sub-coders are arranged in different intervals.

8. The driving apparatus as claimed in claim 1, wherein the controller further comprises a control circuit and a drive circuit, the DC brushless motor comprises a plurality of rotation speeds, wherein:
   the control circuit receives a turn-on/-off signal and generates a control signal; and
   the drive circuit receives the control signal and generates a drive signal to control the rotation speeds of the DC brushless motor.

9. The driving apparatus as claimed in claim 8, wherein the controller further comprises a memory module, when the turn-off duration of the turn-on/-off signal exceeds a reference, the control circuit generates a rotation speed signal and saves the rotation speed signal to the memory module, the rotation speed signal represents the rotation speed when the DC brushless motor is turned-off.

10. The driving apparatus as claimed in claim 1, wherein the controller further comprises a protection circuit being configured to receive a load signal relative to the rotating load of the DC brushless motor, and to generate a protection signal, the control circuit then controls the operation of the DC brushless motor according to the protection signal.

11. The driving apparatus as claimed in claim 10, wherein the protection circuit further comprises:
   a current sensor, being configured to transfer the load signal into a voltage signal;
   a filter, being configured to filter the voltage signal and generate a filtered voltage signal; and
   a comparator, being configured to compare the filtered voltage signal with a first reference and generate the protection signal.

12. The driving apparatus as claimed in claim 11, wherein when the filtered voltage signal exceeds the first reference, the protection signal is adapted to decrease the rotation speed of the DC brushless motor.

13. The driving apparatus as claimed in claim 12, wherein when the filtered voltage signal that exceeds the first reference returns to be lower than the first reference, the protection signal is adapted to increase the rotation speed of the DC brushless motor.

14. The driving apparatus as claimed in claim 12, wherein the comparator is further configured to receive a second reference, when the filtered voltage signal exceeds the second reference, the protection signal is adapted to turn off the DC brushless motor.

15. The driving apparatus as claimed in claim 11, wherein when the filtered voltage signal exceeds the first reference, the protection signal is adapted to turn off the DC brushless motor.

16. The driving apparatus as claimed in claim 10, wherein the load signal is relative to a working temperature of the DC brushless motor.

* * * * *